US012798676B2

(12) United States Patent
Shimanaka et al.

(10) Patent No.: US 12,798,676 B2
(45) Date of Patent: *Nov. 17, 2026

(54) COLLISION AVOIDANCE SUPPORT APPARATUS

(71) Applicant: TOYOTA JIDOSHA KABUSHIKI KAISHA, Toyota (JP)

(72) Inventors: Yumi Shimanaka, Kasugai (JP); Sho Hashimoto, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

This patent is subject to a terminal disclaimer.

(21) Appl. No.: 19/006,592

(22) Filed: Dec. 31, 2024

(65) Prior Publication Data

US 2025/0145216 A1 May 8, 2025

Related U.S. Application Data

(63) Continuation of application No. 18/230,946, filed on Aug. 7, 2023, now Pat. No. 12,227,226, which is a (Continued)

(30) Foreign Application Priority Data

Jan. 21, 2021 (JP) ................................ 2021-008156

(51) Int. Cl.
*B62D 15/02* (2006.01)
*B62D 6/00* (2006.01)

(52) U.S. Cl.
CPC ......... *B62D 15/0265* (2013.01); *B62D 6/002* (2013.01)

(58) Field of Classification Search
CPC .... B62D 15/0265; B62D 6/002; G06V 20/58; G06V 20/584; B60W 10/20; B60W 30/09;

(Continued)

(56) References Cited

U.S. PATENT DOCUMENTS 11,767,057 B2 9/2023 Shimanaka
2005/0033516 A1 2/2005 Kawasaki (Continued)

FOREIGN PATENT DOCUMENTS

JP 2017-043262 A 3/2017
JP 2017-105383 A 6/2017

(Continued)

OTHER PUBLICATIONS

Notice of Allowance dated May 15, 2023 in U.S. Appl. No. 17/574,267.

(Continued)

*Primary Examiner* — Jason Holloway
(74) *Attorney, Agent, or Firm* — Sughrue Mion, PLLC

(57) ABSTRACT

When a collision avoidance steering control start condition becomes satisfied, a driving support ECU starts a steering control to avoid a collision with a frontward vehicle. The ECU prohibits the steering control when an indicated direction by turn indications of the frontward vehicle is the same as a planned direction of the steering control. The ECU sets the start condition to a first start condition, when the turn indicators of the frontward vehicle are not indicating a turning direction. The ECU sets the start condition to a second start condition, when the indicated direction is different from the planned direction. The first and second start conditions have been set such that an inter-vehicular distance between the host vehicle and the frontward vehicle of when the second start condition can be satisfied is shorter than one of when the first start condition can be satisfied.

4 Claims, 10 Drawing Sheets

Related U.S. Application Data continuation of application No. 17/574,267, filed on Jan. 12, 2022, now Pat. No. 11,767,057.

(58) Field of Classification Search

CPC ........... B60W 30/095; B60W 30/0956; B60W 30/18163; B60W 2554/404; B60W 2554/4045; B60W 2710/20; B60W 2710/207; B60W 10/06; B60W 10/18; B60W 30/0953; B60W 40/02; B60W 40/105; B60W 40/107; B60W 40/109; B60W 40/112; B60W 2420/42; B60W 2420/52; B60W 2510/202; B60W 2540/18

See application file for complete search history.

(56) References Cited

U.S. PATENT DOCUMENTS

2017/0057498 A1 3/2017 Katoh
2017/0166254 A1 6/2017 Katoh
2018/0178783 A1 6/2018 Saiki
2018/0178790 A1 6/2018 Oguri
2018/0356505 A1 12/2018 Miyata
2019/0023267 A1 1/2019 Takagi
2020/0023836 A1 1/2020 Schneider
2020/0023860 A1* 1/2020 Lee ....................... B60W 30/09
2021/0146958 A1 5/2021 Tanaka
2021/0268998 A1 9/2021 Brickwedde et al.
2022/0001859 A1 1/2022 Park
2022/0067408 A1 3/2022 Sheu et al.
2022/0258730 A1* 8/2022 Morotomi ............. B60W 10/20
2022/0343762 A1 10/2022 Alvarez et al.
2023/0382455 A1 11/2023 Shimanaka

FOREIGN PATENT DOCUMENTS

JP 2018-106230 A 7/2018
JP 2019-002690 A 1/2019
JP 2019-002691 A 1/2019
JP 2019-003235 A 1/2019

OTHER PUBLICATIONS

Notice of Allowance issued Oct. 25, 2024 in U.S. Appl. No. 18/230,946.
U.S. Appl. No. 18/230,946, filed Aug. 7, 2023.
U.S. Appl. No. 17/574,267, filed Jan. 12, 2022.

* cited by examiner

COLLISION AVOIDANCE SUPPORT APPARATUS

CROSS-REFERENCE TO RELATED APPLICATIONS

This is a continuation of U.S. application Ser. No. 18/230,946 filed Aug. 7, 2023, which is continuation of U.S. application Ser. No. 17/574,267 filed Jan. 12, 2022 (now U.S. Pat. No. 11, 767, 057 issued Sep. 26, 2023), claiming priority based on Japanese Patent Application No. 2021-008156 filed Jan. 21, 2021, the contents of all of which are incorporated herein by reference in their entirety.

TECHNICAL FIELD

The present disclosure relates to a collision avoidance support apparatus configured to perform a collision avoidance steering control for steering a host vehicle so as to avoid a collision between the host vehicle and an other vehicle (i.e., a frontward vehicle) that is present in front of (or ahead of) the host vehicle.

BACKGROUND

One of conventional collision avoidance support apparatuses automatically steers the host vehicle in such a manner that the host vehicle moves along a collision avoidance path when there is a high probability that the host vehicle collides with an obstacle that is present in front of the host vehicle, if the collision avoidance path exists. The collision avoidance path is a route for the host vehicle and that allows the host vehicle to avoid the collision with the obstacle as well as a collision with the other object.

The above-described conventional apparatus is disclosed in Japanese Patent Application Laid-Open No. 2017-43262.

There may be a case in which the obstacle that is present ahead of the host vehicle is the forward vehicle and either one of a left turn indicator (left turn signal/blinker) and a right turn indicator (right turn signal/blinker) of the frontward vehicle is blinking/operating so as to indicate either one of a left (leftward direction) and a right (rightward direction). Hereinafter, the direction indicated by one of the left turn indicators and the right turn indicators is sometimes referred to as an "indicated direction". In this case, the indicated direction may sometimes be a direction different from a turning direction of the host vehicle planned by the collision avoidance steering control. The turning direction of the host vehicle planned by the collision avoidance steering control is one of the leftward direction and the rightward direction, and is sometimes referred to as a "planned collision avoidance direction". When this happens (i.e., when the indicated direction is the direction different from the planned collision avoidance direction), the frontward vehicle is likely to move away in a lateral direction from the host vehicle after the host vehicle starts turning along the collision avoidance path (i.e., after the collision avoidance steering control is started). Thus, if the collision avoidance steering control is started at an early time point, and thereafter, the frontward vehicle moves in the indicated direction, a lateral movement amount of the host vehicle by the collision avoidance steering control may be too large or the collision avoidance steering control may have been unnecessary. Accordingly, a driver of the host vehicle may feel bothered by the collision avoidance steering control.

Whereas, in a case where the indicated direction is the same direction as the planned collision avoidance direction, there is a high possibility that the frontward vehicle comes closer to the collision avoidance path. In this case, the frontward vehicle may come excessively closer to or collide with the host vehicle that is trying to avoid the collision by the collision avoidance steering control.

SUMMARY

The present disclosure is made to cope with the problems described above. One of objectives of the present disclosure is to provide a collision avoidance support apparatus capable of executing a collision avoidance steering control in such a manner that a frontward vehicle does not come excessively closer to a host vehicle, and of preventing a driver of the host vehicle from being bothered by the collision avoidance steering control. Hereinafter, the collision avoidance support apparatus according to the present disclosure may sometimes be referred to as a "present disclosure support apparatus".

The present disclosure support apparatus (10) comprises:

- a surroundings monitoring sensor (21) including a camera sensor (21*b*) configured to take a picture of a view of an area ahead of a host vehicle (SV) so as to obtain image data representing the area, the surroundings monitoring sensor being configured to obtain information on an other vehicle which is a frontward vehicle (OV1) present in the area based on at least the image data;
- a turning angle actuator (52) configured to vary a turning angle of the host vehicle; and
- a control unit (20) configured to:
  - obtain through calculation, using the image data, a target path for avoiding a collision between the host vehicle and the frontward vehicle (step 815), when the control unit determines, based on information obtained from the surroundings monitoring that a collision sensor, probability condition becomes satisfied, the collision probability condition being a condition to be satisfied when there is a probability that the host vehicle collides with the frontward vehicle (step 710, step 715, step 720); and
  - start performing a collision avoidance steering control to control the turning angle actuator to cause the host vehicle to travel along the target path (step 855), when it is determined that a predetermined collision avoidance steering control start condition becomes satisfied (step 850).

The control unit is configured to:

- obtain planned collision avoidance direction information indicative of a planned collision avoidance direction indicated by the target path, the planned collision avoidance direction being either a leftward direction or a rightward direction and being a direction which the target path causes the host vehicle to change a moving direction to (step 830);
- determine, based on the image data, whether or not a state of turn indicators of the frontward vehicle is a turning direction indicating state that is a state in which the turn indicators are indicating an expected moving direction of the frontward vehicle (step 835);
- obtain, based on the image data, information on an indicated direction that represents which one of the leftward direction and the rightward direction the expected moving direction is, when it is determined that the state of turn indicators is the turning direction indicating state (step 860);

set the collision avoidance steering control start condition to a first start condition that is a condition to be satisfied when an inter-vehicular distance between the host vehicle and the frontward vehicle becomes equal to a first distance, when it is determined that the state of turn indicators is not the turning direction indicating state (step 840, step 845);

determine, based on the information on the indicated direction and the planned collision avoidance direction information, whether or not the expected moving direction of the frontward vehicle is a direction that is the same as the planned collision avoidance direction (step 865);

prohibit executing the collision avoidance steering control when it is determined that the expected moving direction of the frontward vehicle is the direction that is the same as the planned collision avoidance direction (step 856: No, step 825); and set the collision avoidance steering control start condition to a second start condition that is a condition to be satisfied when the inter-vehicular distance becomes a distance that is shorter than the first distance of when the first start condition can be satisfied, when it is determined that the expected moving direction of the frontward vehicle is a direction that is different from the planned collision avoidance direction (step 865: Yes, step 870, step 875).

The present disclosure support apparatus determines whether or not the state of the turn indicators of the frontward vehicle is the turning direction indicating state that is a state in which the turn indicators are indicating which a rightward direction or a leftward direction an expected moving direction of the frontward vehicle is. According to the present disclosure support apparatus, executing the collision avoidance steering control is prohibited when it is determined that the state of the turn indicators of the frontward vehicle is the turning direction indicating state and that the expected moving direction of the frontward vehicle is the direction that is the same as the planned collision avoidance direction. Accordingly, the present disclosure support apparatus can decrease the possibility that the host vehicle collides with the frontward vehicle.

According to the present disclosure support apparatus, when it is determined that the state of turn indicators is not the turning direction indicating state, the collision avoidance steering control start condition is set to a first start condition that is a condition that can be satisfied when an inter-vehicular distance between the host vehicle and the frontward vehicle becomes equal to a first distance. Whereas, when it is determined that the state of turn indicators is the turning direction indicating state and that the expected moving direction of the frontward vehicle is a direction that is different from the planned collision avoidance direction, the collision avoidance steering control start condition is set to a second start condition. The second start condition is a condition that can be satisfied when the inter-vehicular distance becomes a distance that is shorter than the first distance which is a distance between the host vehicle and the frontward vehicle of when the first start condition can be satisfied. In other words, the second start condition can be satisfied at a later/delayed timing as compared to the first start condition. Therefore, when the expected moving direction of the frontward vehicle and the planned collision avoidance direction of the host vehicle are different from each other in a direction, the present disclosure support apparatus can decrease a possibility that a movement amount in a lateral direction of the host vehicle may become excessively large due to the collision avoidance steering control. Accordingly, the apparatus can decrease a possibility that the driver feels uncomfortable/bothered by the collision avoidance steering control.

In one of the embodiments of the present disclosure support apparatus, the collision avoidance steering control start condition includes at least a condition to be satisfied when a collision probability indicating value (TTC) indicative of a probability that the host vehicle collides with the frontward vehicle reaches a collision probability threshold (TTCth). The control unit is configured to set the collision probability threshold (TTC2) used in the second start condition to a value different from the collision probability threshold (TTC1) used in the first start condition.

More specifically, the collision avoidance steering control start condition includes at least a condition to be satisfied when a collision prediction time (TTC) that is a predicted time length until the host vehicle collides with the frontward vehicle is shorter than a predetermined collision determination threshold time (TTCth). The control unit is configured to set the collision determination threshold time (TTCth) used in the first start condition to a first time (TTC1), and to set the collision determination threshold time (TTCth) used in the second start condition to a second time (TTC2) shorter than the first time.

According to the above embodiments, the collision determination threshold time used when it is determined that the state of the turn indicators of the frontward vehicle is the turning direction indicating state and that the expected moving direction of the frontward vehicle and the planned collision avoidance direction of the host vehicle are different from each other in a direction is set to a value different from the collision determination threshold time used when it is determined that the state of the turn indicators of the frontward vehicle is not the turning direction indicating state. This makes the collision avoidance steering control start condition used when it is determined that the expected moving direction of the frontward vehicle and the planned collision avoidance direction of the host vehicle are different from each other in a direction be the second start condition that can be satisfied at a time point at which the inter-vehicular distance becomes shorter than an inter-vehicular distance of when the first start condition can be satisfied.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

<Configuration>

Figure 1:
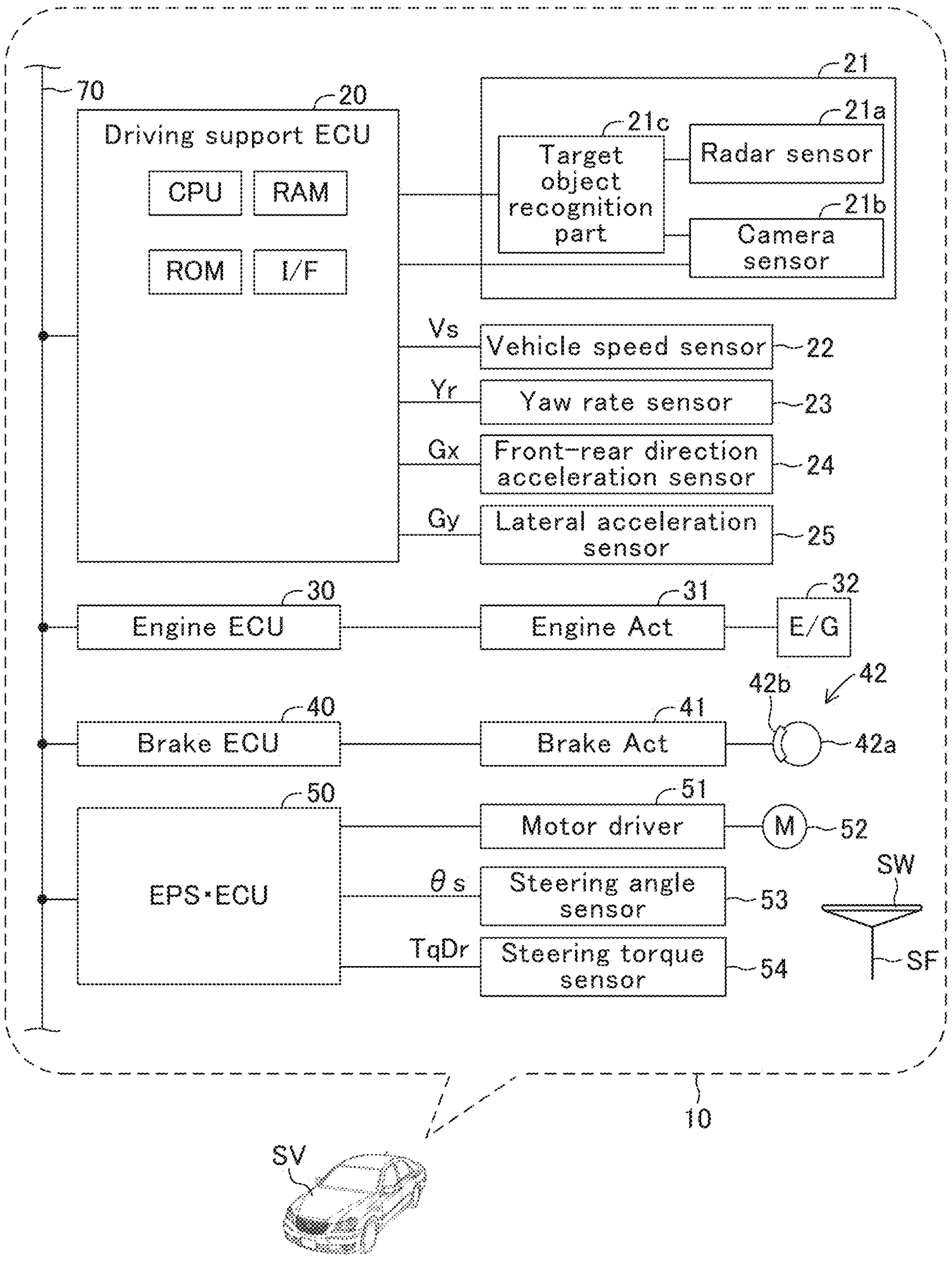
FIG. 1 is a schematic diagram of a collision avoidance support apparatus according to an embodiment of the present disclosure.

As shown in FIG. 1, a collision avoidance support apparatus 10 is applied to a vehicle SV. The vehicle SV is sometimes referred to as a "host vehicle 10" in order to be distinguished from other vehicles. The collision avoidance support apparatus 10 comprises a driving assist/support ECU 20, an engine ECU 30, a brake ECU 40, and an electric power steering ECU 50. Hereinafter, the driving support ECU 20 is sometimes referred to as a "DSECU", and the electric power steering ECU 50 is sometimes referred to as an "EPS. ECU 50".

Each of these ECUs is an electronic/electric control unit that includes a microcomputer as a main component, and is sometimes referred to as a controller. These ECUs are connected with to one another through a CAN (controller area network) 70 so as to be capable of mutually exchanging data with one another. The microcomputer includes a CPU, a ROM, a RAM, and an interface (I/F). The CPU realizes various functions by executing instructions (programs, routines) stored in the ROM. Some or all of the ECUs may be integrated into a single ECU.

The DSECU is connected with a surroundings monitoring sensor 21, a vehicle speed sensor 22, a yaw rate sensor 23, a front-rear direction acceleration sensor 24, and a lateral acceleration sensor 25. The DSECU receives detection signals and/or output signals from those sensors. It should be noted that each of the sensors may be connected to one of the ECUs other than the DSECU. In this case, the DSECU receives the detection signal and/or the output signal of that sensor via CAN from the ECU connected to that sensor.

The surroundings monitoring sensor 21 includes a radar sensor 21*a*, a camera sensor 21*b*, and a target object recognition part 21*c*. The surroundings monitoring sensor 21 constitutes an obstacle recognition device obstacle from a function viewpoint. The camera sensor 21*b* constitutes an indicated direction recognition device from a function viewpoint. The target object recognition part 21*c* has an ECU including a microcomputer.

The surroundings monitoring sensor 21 detects/recognizes an object that is present in a "surrounding area of the host vehicle SV" including a predetermined area (frontward area) ahead of (in front of) the host vehicle so as to obtain information on the detected/recognized object. The object includes a moving object (e.g., a pedestrian, a bicycle, and a vehicle), and a fixed/stationary object (e.g., an electric pole, a tree, and a guard rail). Hereinafter, the object may sometimes be referred to as a "target object".

The surroundings monitoring sensor 21 obtains through calculation information (hereinafter, sometimes referred to as "target object information") on the detected object, and transmits the target object information to the DSECU. The target object information includes the following information.

- A longitudinal distance Dfx of the target object: The longitudinal distance Dfx of the target object is a distance, having a plus or minus sign, between a front end of the host vehicle SV and the target object in a direction (an x-axis direction) of a center line extending in a front rear (longitudinal) direction of the host vehicle SV.
- A lateral position Dfy of the target object: The lateral position Dfy of the target object is a distance, having a plus or minus sign, between a center position of the target object in a object width direction and the center line of the host vehicle SV, in a direction (a y-axis direction) orthogonal to the center line.
- A relative speed Vfx of the target object: The relative speed Vfx of the target object is a difference (=Vb−Vs) between a moving speed of the target object in the x-axis direction and a vehicle speed (a speed in the x-axis direction) Vs of the host vehicle SV.
- Information indicative of a type (kind) of the target object (e.g., information indicating which type the target object is, a vehicle, a pedestrian, or a stationary object).
- A width W (a left-right direction width) of the target object.
- A length L of the target object.

It should be noted that a set of the longitudinal distance Dfx and the lateral position Dfy is sometimes referred to as a "detected target object position".

The surroundings monitoring sensor 21 obtains the target object information in a predefined x-y coordinate system. The x-axis is a coordinate axis that extends in the front rear direction of the host vehicle SV and passes through a center position of the front end of the host vehicle SV in the vehicle width direction. A position ahead of the vehicle assumes a positive value on the x-axis. The y-axis is a coordinate axis that is orthogonal to the x-axis. A position on the left hand of the host vehicle SV assumes a positive value on the y-axis. An origin of the x-axis and an origin of the y-axis coincides with a predetermined position of the host vehicle (e.g., the center position of the front end of the host vehicle SV in the vehicle width direction).

The radar sensor 21*a* includes a radar wave transmitting and receiving section and a processing section. The radar wave transmitting and receiving section radiates/emits an electric wave (hereinafter, referred to as a "millimeter wave") in the millimeter waveband toward the surrounding area of the host vehicle SV including at least the frontward area of the host vehicle SV, and receives a "reflected wave of the radiated millimeter wave" produced by the obstacle (i.e., a reflection point). It should be noted that the radar sensor 21*a* may be a radar sensor using an electric wave in a waveband other than the millimeter waveband.

The processing section of the radar sensor 21*a* is configured to determine whether or not the object is present, based on reflection point information including a phase difference between the radiated millimeter wave and the received reflected wave, an attenuation ratio of the received reflected wave, and a time difference from a time point at which the millimeter wave is radiated to a time point at which the reflected wave is received. The processing section of the radar sensor 21*a* is configured to group a plurality of reflection points that are highly likely to represent a detected single object so as to recognize a grouped reflection points as the single target object (refer to Japanese Application Laid-Open No. 2019-003235, Japanese Application Laid-Open No. 2019-002691, and Japanese Application Laid-Open No. 2019-002690).

In addition, the processing section of the radar sensor 21*a* is configured to obtain through calculation, based on the reflection point information of the reflection points belonging to the recognized target object, the longitudinal distance Dix of the target object, the lateral position Dfy of the target object, a direction Op of the target object with respect to the host vehicle SV, and relative speed Vfx of the target object with respect to the host vehicle SV. Hereinafter, the information including these values (Dfx, Dfy, Op, Vfx) obtained by the radar sensor 21*a* is sometimes referred to as "radar sensor detection information".

The camera sensor 21*b* includes a stereo camera and an image processing section. The stereo camera photographs (takes an image of) views/landscapes of "the left side area and the right side area" that are in front of (ahead of) the host vehicle SV (that is, the frontward area of the host vehicle SV) so as to acquire a pair of left and right image data (image data representing the frontward area). The image processing section is configured to determine, based on the image data, whether or not the target object is present in the frontward area of the host vehicle SV.

When the image processing section determines that the target object is present in the frontward area of the host vehicle SV, the image processing section obtains through calculation, based on the image data, the direction Op of the target object with respect to the host vehicle SV, the longitudinal distance Dfx of the target object, and the relative speed Vfx of the target object with respect to the host vehicle SV. In addition, the image processing section identifies/specifies, based on the image data, the type of the target object using a well-known pattern matching method so as to obtain information representing the type of the target object. The information obtained by the image processing section is sometimes referred to as "camera sensor detection information".

The target object recognition part 21*c* receives the radar sensor detection information from the processing section of the radar sensor 21*a*, and receives the camera sensor detection information from the image processing section from the camera sensor 21*b*.

The target object recognition part 21*c* is configured, based on the radar sensor detection information and the camera sensor detection information, to obtain/finalize final target object information on the target object. The target object recognition part 21*c* is configured to transmit the thus obtained final target object information to the DSECU, every time a predetermined time elapses.

The image processing section of the camera sensor 21*b* is configured to recognize/detect, based on the obtained image data, lane markers (hereinafter, sometimes simply referred to as "while lines") such as left and right white lines on a road, in accordance with a well-known method. For instance, the image processing section detects an edge point at which luminance (brightness) of the image drastically changes, and extracts a contour of the white line based on the detected edge points so as to recognize the left white line or the right white line.

The image processing section is configured to obtain, through calculation, position information on the left and right white lines defining a lane (traveling lane) in which the vehicle SV is running so as to transmit the position information on the left and right white lines to the DSECU every time a predetermined time elapses. The position information on the left and right white lines is represented by coordinate values of the x-y coordinate system.

Furthermore, when the surroundings monitoring sensor 21 (e.g., the image processing section of the camera sensor 21*b*) recognizes that the type of the target object present ahead of the host vehicle SV is a vehicle (hereinafter, sometimes refereed to as a "frontward vehicle"), the surroundings monitoring sensor 21 obtains turn indicator information described below, based on current image data and past image data, and transmits the thus obtained turn indicator information to the DSECU. The turn indicator information includes:

Information indicative of (representing) whether or not at least one of turn indicators of the frontward vehicle is blinking (operating).

Information indicative of (representing) whether or not only either one of "a left turn indicator(s) and a right turn indicator(s)" of the frontward vehicle is blinking (operating), when at least one of the turn indicators of the frontward vehicle is blinking.

Information indicative of (representing) which is blinking (operating), the left turn indicator(s) or the right turn indicator(s), when only either one of "the left turn indicator(s) and the right turn indicator(s)" of the frontward vehicle is blinking (operating). This information is sometimes referred to as "information on an indicated direction" or "indicated direction information".

More specifically, when only the left turn indicator(s) among the left turn indicator(s) and the right turn indicator (s) of the frontward vehicle is blinking, the image processing section obtains, as the information on the indicated direction, information indicating/representing that the indicated direction is the leftward direction. When only the right turn indicator(s) among the left turn indicator(s) and the right turn indicator(s) of the frontward vehicle is blinking, the image processing section obtains, as the information on the indicated direction, information indicating/representing that the indicated direction is the rightward direction. It should be noted that the indicated direction cannot be identified/determined, when neither the left turn indicator(s) nor the right turn indicator(s) is blinking. Furthermore, the indicated direction cannot be identified/determined, when both of the left turn indicator(s) and the right turn indicator(s) are blinking. Therefore, in these cases (i.e., when the indicated direction cannot be identified/determined), the image processing section transmits, as the information on the indicated direction, information indicating/representing that a state of the turn indicators (i.e., the left turn indicator(s) and the right turn indicator(s)) is not in the state of indicating a turning direction (i.e., state in which the indicated direction cannot be identified), to the DSECU.

The vehicle speed sensor 22 is configured to detect a running speed (i.e., the vehicle speed) of the host vehicle SV in the x-axis direction, and generate a signal indicative of the vehicle speed Vs.

The yaw rate sensor 23 is configured to detect a yaw rate of the host vehicle SV, and generate a signal indicative of the yaw rate Yr.

The front-rear direction acceleration sensor 24 is configured to detect a front-rear direction acceleration of the host vehicle SV, and generate a signal indicative of the front-rear direction acceleration Gx. When the front-rear direction acceleration Gx is a negative value, a magnitude (an absolute value) of the front-rear direction acceleration Gx represents a front-rear direction deceleration.

The lateral acceleration sensor 25 is configured to detect a lateral direction acceleration of the host vehicle SV, and generate a signal indicative of the lateral acceleration Gy.

The engine ECU 30 is connected to an engine actuator 31. The engine actuator 31 includes a throttle valve actuator for changing an opening degree of the throttle valve of an engine 32. The engine ECU 30 is configured to drive the engine actuator 31 so as to vary a torque generated by the engine 32. The torque generated by the engine 32 is transmitted to drive wheels through an unillustrated transmission.

Therefore, the engine ECU 30 can control a driving force of the vehicle SV by controlling the engine actuator 31 so as to vary an acceleration state (the front-rear direction acceleration Gx) of the host vehicle SV. It should be noted that the engine ECU 30 can control the driving force of the vehicle SV by controlling at least one of "the engine and a motor" that serve as a vehicle driving source, when the host vehicle SV is a hybrid electric vehicle. The engine ECU 30 can control the driving force of the vehicle SV by controlling a motor that serves as a vehicle driving source, when the host vehicle SV is a battery electric vehicle.

The brake ECU 40 is connected to a brake actuator 41. The brake actuator 41 is disposed in a hydraulic circuit between a master cylinder and frictional brake mechanisms 42. The master cylinder pressures a working fluid using a force on a brake pedal. Each of a front-left wheel, a front-right wheel, a rear-left wheel, and a rear-right wheel is equipped with each of the frictional brake mechanisms 42. Each of the frictional brake mechanisms 42 includes a brake disc 42*a* fixed to one of the wheels, and a brake caliper 42*b* fixed to a vehicle body.

The brake actuator 41 adjusts a hydraulic pressure of the working fluid to be supplied to a wheel cylinder integrated into the brake caliper 42*b* in accordance with an instruction from the brake ECU 40, so as to actuate the wheel cylinder. Through this operation, the brake actuator 41 can press a brake pad against brake discs 42*a*, to thereby generate frictional braking force. Thus, the brake ECU 40 can control a l braking force of the host vehicle SV by controlling the brake actuator 41, so as to vary the acceleration state (negative front-rear direction acceleration Gx) of the host vehicle SV.

The EPS•ECU 50 is a control unit of a well-known electric power steering system. The EPS•ECU 50 is connected to a motor driver 51. The motor driver 51 is connected to a steering motor 52. The steering motor 52 is incorporated into a "steering mechanism including a steering wheel SW, a steering shaft SF, and an unillustrated gear mechanism for steering". The steering motor 52 is an electric motor to generate a steering torque using electric power supplied from the motor driver 51 to thereby be able to steer the right and left steered wheels of the host vehicle SV. Namely, the steering motor 52 is functions as a turning angle actuator (steering actuator) to change the turning angle (steered angle of the steered wheels) of the host vehicle SV.

The EPS•ECU 50 is connected to a steering angle sensor 53 and a steering torque sensor 54. The steering angle sensor 53 is configured to detect a steering angle of the steering wheel SW of the host vehicle SV, and generate a signal indicative of the detected steering angle θs. The steering torque sensor 54 is configured to detect a steering torque (hereinafter, referred to as a "driver's torque TqDr") applied to the steering shaft SF of the host vehicle SV by an operation on the steering wheel SW, and generate a signal indicative of the driver's torque TqDr. Each of the steering angle θs and the driver's torque TqDr assumes a positive value when a steering operation to cause the host vehicle SV to turn left, and assumes a negative value when a steering operation to cause the host vehicle SV to turn right.

The EPS•ECU 50 drives the steering motor 52, based on the detected steering angle θs and the detected driver's torque TqDr so as to generate a steering assist torque to assist the steering operation by the driver.

When the EPS•ECU 50 receives a steering instruction from the DSECU in a period in which a collision avoidance steering control is being executed, the EPS•ECU 50 drives the steering motor 52 using the motor driver 51, based on a target turning angle (or a target steering torque) specified by the steering instruction. In this manner, the DSECU can automatically vary the turning angle of the host vehicle SV (i.e., steer the steered wheels) through the EPS. ECU 50.

<An Outline of the Collision Avoidance Steering Control>

Figure 2:
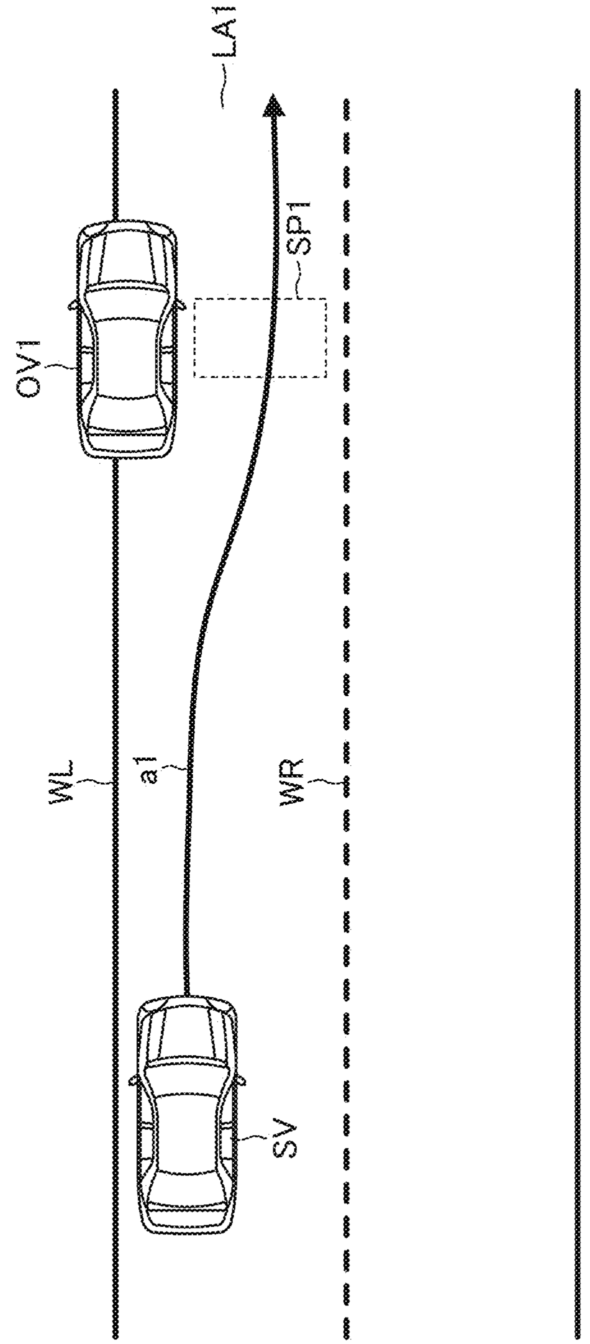
FIG. 2 is a figure for describing an outline of a collision avoidance steering control.

As shown in FIG. 2, it is now assumed that a situation occurs where a frontward vehicle OV1 that is an object (target object) is present in the frontward area (ahead of the host vehicle SV) while the host vehicle SV is traveling in a traveling lane LA1 that is a straight lane.

The DSECU has been recognizing the traveling lane LA1 defined by the left white line WL and the right white line WR, based on the position information on the left white line WL and the right white line WR, every time a predetermined time elapses.

The DSECU obtains, through calculation, a predicted travel trajectory (path) of the host vehicle SV, based on "the steering angle θs, the yaw rate Yr, and the vehicle speed Vs" of the host vehicle SV on the assumption that the host vehicle SV runs with maintaining its current running state.

The DSECU obtains, through calculation, a predicted travel trajectory of the frontward vehicle OV1 on the assumption that the frontward vehicle OV1 runs with maintaining its current running state, based on the target object information on the frontward vehicle OV1. The predicted travel trajectory of the frontward vehicle OV1 is a path along which the frontward vehicle OV1 is predicted/expected to travel. More specifically, the DSECU obtains the "predicted travel trajectory of the frontward vehicle OV1" based on a plurality of the positions of the frontward vehicle OV1, each of which was detected every time a predetermined time elapsed, and a currently detected position of the frontward vehicle OV1.

The DSECU determines whether or not a collision probability condition is satisfied, based on the predicted travel trajectory of the vehicle SV and the predicted travel trajectory of the frontward vehicle OV1. The collision probability condition is a condition to be satisfied when there is a probability that the host vehicle SV will collide with the frontward vehicle OV1 (in other words, the predicted travel trajectory of the vehicle SV and the predicted travel trajectory of the frontward vehicle OV1 intersect with each other) on the assumption that the host vehicle SV and the frontward vehicle OV1 run with maintaining their respective current running states. When the DSECU determines that collision probability condition is satisfied, the DSECU determines that there is a probability that the host vehicle SV collides with the frontward vehicle OV1 (in other words, determines that the frontward vehicle OV1 that is likely to collide with the host vehicle SV is present).

When the DSECU determines that there is the probability that the host vehicle SV collides with the frontward vehicle OV1, the DSECU obtains, through calculation, a collision prediction time TTC with respect to the frontward vehicle OV1, based on the longitudinal distance Dfx of the frontward vehicle OV1 and the relative speed Vfx of the frontward vehicle OV1. More specifically, the DSECU obtains the collision prediction time TTC by dividing the longitudinal distance Dfx by the relative speed Vfx to acquire an interim value, and thereafter, by inverting the sign of the interim value (i.e., TTC=−Dfx/Vfx). It should be noted that the DSECU may obtain the collision prediction time TTC by dividing a "distance between a predicted collision point and the current position of the host vehicle SV" by the current vehicle speed Vs of the host vehicle SV. The predicted collision point is a point at which it is predicted that the host vehicle SV collides with the frontward vehicle OV1 (i.e., the point at which the predicted travel trajectory of the vehicle SV and the predicted travel trajectory of the frontward vehicle OV1 intersect with each other).

In addition, the DSECU obtains, through calculation, a path (referred to as a "target collision avoidance path/route") along which the host vehicle SV can travel in order to avoid the collision with the frontward vehicle OV1, in accordance with a well-known method. More specifically, the DSECU obtains/sets, as the target collision avoidance path a1, a path that causes the host vehicle to turn (change a moving direction) to avoid an interference (the collision) with the frontward vehicle OV1 (for example, with respect to the method for determining/setting the target collision avoidance path, refer to Japanese Patent Application Laid-Open No. 2017-105383, Japanese Patent Application Laid-Open No. 2017-43262, and Japanese Patent Application Laid-Open No. 2018-106230, and these are hereby incorporated by reference).

In the present example, the target collision avoidance path a1 is determined/obtained, based on the target information on the frontward vehicle OV1, the position information on the left and right white lines, or the like, in such a manner that at least all of the following conditions (A1-A3) are satisfied.

Condition A1: a condition to be satisfied when there is a space SP1 (referred to as an collision avoidance space SP1) which is located on "the left side of the right side" of the frontward vehicle OV1 that is positioned at the predicted collision point between the host vehicle SV and the frontward vehicle OV1, and through which the host vehicle SV can pass/travel.

Condition A2: a condition to be satisfied when the host vehicle SV does not deviate from the traveling lane defined by the left white line and the right white line on the assumption that the host vehicle travels along the target collision avoidance path a1.

Condition A3: a condition to be satisfied when the host vehicle SV can pass through the collision avoidance space SP1 while keeping a magnitude of the lateral acceleration Gy at a value smaller than a lateral acceleration threshold and keeping a magnitude of the yaw rate Yr at a value smaller than a yaw rate threshold, on the assumption that the host vehicle starts to travel along the target collision avoidance path a1 from a current traveling condition/state of the host vehicle SV.

Thereafter, the DSECU determines whether or not a predetermined collision avoidance steering control start condition becomes satisfied. The collision avoidance steering control start condition is a condition to be satisfied when both of a first condition described below and a second condition described below are satisfied.

First condition: a condition to be satisfied when the collision prediction time TTC is shorter than a threshold time TTCth. It should be noted the threshold time TTCth is sometimes referred to as a "collision determination threshold time". The collision prediction time TTC is a value that becomes smaller as the probability of the collision becomes higher, and is sometimes referred to as a "collision probability indicating value." Accordingly, the first condition may be said to be a condition that becomes satisfied when the probability of the collision becomes equal to or higher than a collision probability threshold.

Second condition: a condition to be satisfied when an "object other than the frontward vehicle OV1" is not present, the "object other than the frontward vehicle OV1" being an object that collides with the host vehicle SV or whose distance to the host vehicle becomes equal to or smaller than a predetermined minimum distance on the assumption that the host vehicle travels along the target collision avoidance path a1.

When the collision avoidance steering control start condition becomes satisfied, the DSECU obtains, through calculation, a target yaw rate for letting the host vehicle travel along the target collision avoidance path a1.

The DSECU obtains, through calculation, based on the calculated target yaw rate and the vehicle speed Vs of the host vehicle SV, a target turning angle that is allow the yaw rate Yr to coincide with the target yaw rate. Thereafter, the DSECU transmits a steering instruction for collision avoidance representing the target turning angle to the EPS. ECU 50.

The EPS. ECU 50 obtains, through calculation, a target steering torque that is necessary for the actual turning angle to coincide with the target turning angle. The EPS. ECU 50 drives the steering motor 52 in such a manner that the steering motor 52 outputs the steering torque corresponding to the target steering torque so as to turn the steered wheels of the host vehicle SV. In this manner, the DSECU varies the turning angle of the host vehicle SV through the EPS•ECU 50 so as to let the host vehicle SV travel along the target collision avoidance path a1. This allows the host vehicle SV to avoid the collision with the frontward vehicle OV1 without deviating from the traveling lane LA1 and without colliding with the other object. The descriptions above are the outline of the basic collision avoidance steering control.

<An Outline of the Collision Avoidance Steering Control in Response to the State of the Turn Indicators>

When the DSECU determines that there is the probability that the host vehicle SV will collide with the frontward vehicle OV1, the DSECU obtains the above described "turn indicator information including the indicated direction information" from the surroundings monitoring sensor 21.

Furthermore, the DSECU obtains the planned collision avoidance direction of the host vehicle SV based on the target collision avoidance path a1. For instance, when the target collision avoidance path a1 curves to right (i.e., when the target collision avoidance path a1 is a route that causes a position of the host vehicle SV in the lane width direction to move to the right), the DSECU obtains, as the information on the planned collision avoidance direction, information indicating that the planned collision avoidance direction is rightward. Likewise, when the target collision avoidance path a1 curves to left (i.e., when the target collision avoidance path a1 is a route that causes the position of the host vehicle SV in the lane width direction to move to the left), the DSECU obtains, as the information on the planned collision avoidance direction, information indicating that the planned collision avoidance direction is leftward.

(A Case in which the State of the Turn Indicators is not the Turning Direction Indicating State)

When the state of the turn indicators is not the turning direction indicating state, the DSECU sets the threshold time TTCth used in a first condition of the collision avoidance steering control start condition to a first time TTC1. The collision avoidance steering control start condition in which the threshold time TTCth is set at the first time TTC1 is referred to as a "first start condition", for convenience sake. Setting the threshold time TTCth to the first time TTC1 has the same meaning as setting the collision probability threshold to a first probability threshold.

Figure 3:
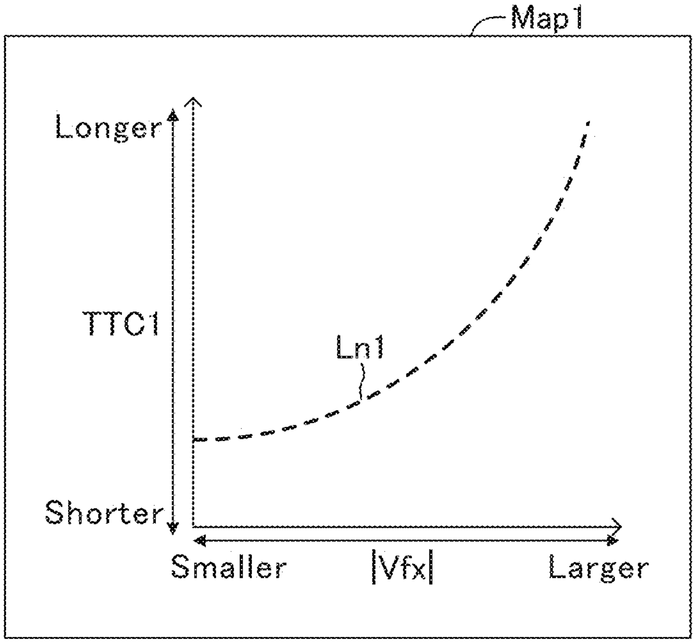
FIG. 3 is a figure for describing a first map Map1.

More specifically, the DSECU determines (obtains) the first time TTC1 by applying an absolute vale (|Vfx|) of the relative speed Vfx of the frontward vehicle OV1 to a first map Map1 that is a lookup table shown in FIG. 3. According to the first map Map1, as shown by a broken line Ln1, the first time TTC1 becomes longer as the absolute vale (|Vfs|) of the relative speed Vfx of the frontward vehicle OV1 becomes larger.

(A Case in which the Indicated Direction by the Turn Indicators of the Frontward Vehicle OV1 is the Same Direction as the Planned Collision Avoidance Direction of the Host Vehicle SV)

Figure 4:
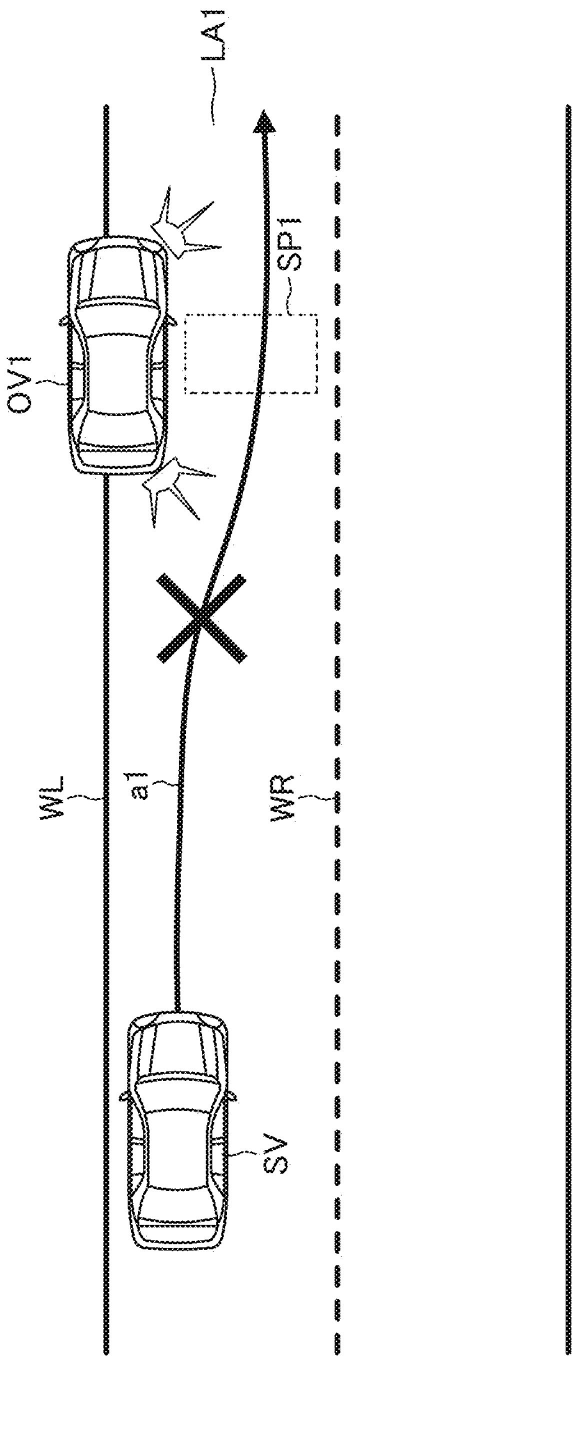
FIG. 4 is a figure for describing an outline of operations of the collision avoidance support apparatus.

In an example shown in FIG. 4, the right turn indicators of the frontward vehicle OV1 are blinking/operating (i.e., the indicated direction by the turn indications is the rightward direction), and the planned collision avoidance direction of the host vehicle SV is the rightward direction. Therefore, the indicated direction by the turn indicators is the same direction as the planned collision avoidance direction of the host vehicle SV.

In such a case where the indicated direction by the turn indicators of the frontward vehicle OV1 is the same direction as the planned collision avoidance direction of the host vehicle SV, there is a probability that the frontward vehicle OV1 starts moving in the indicated direction after the collision avoidance steering control is started. When the frontward vehicle OV1 starts moving in the indicated direction after the collision avoidance steering control is started, the host vehicle SV and the frontward vehicle OV1 may collide with each other even though the host vehicle SV is trying to avoid the collision by the collision avoidance steering control. Therefore, in this case, the DSECU prohibit (stops) executing the collision avoidance steering control. This allows the DSECU to decrease a possibility that the host vehicle SV collides with the frontward vehicle OV1 even though the DSECU has been executing the collision avoidance steering control. It should be noted that the DSECU is configured to be capable of executing an automatic brake control that is one of the well-known collision avoidance controls. Accordingly, in the above case, the collision between the host vehicle SV and the frontward vehicle OV1 can be avoided by the automatic brake control.

(A Case in which the Indicated Direction by the Turn Indicators of the Frontward Vehicle OV1 is a Direction Different from the Planned Collision Avoidance Direction of the Host Vehicle SV)

Figure 5:
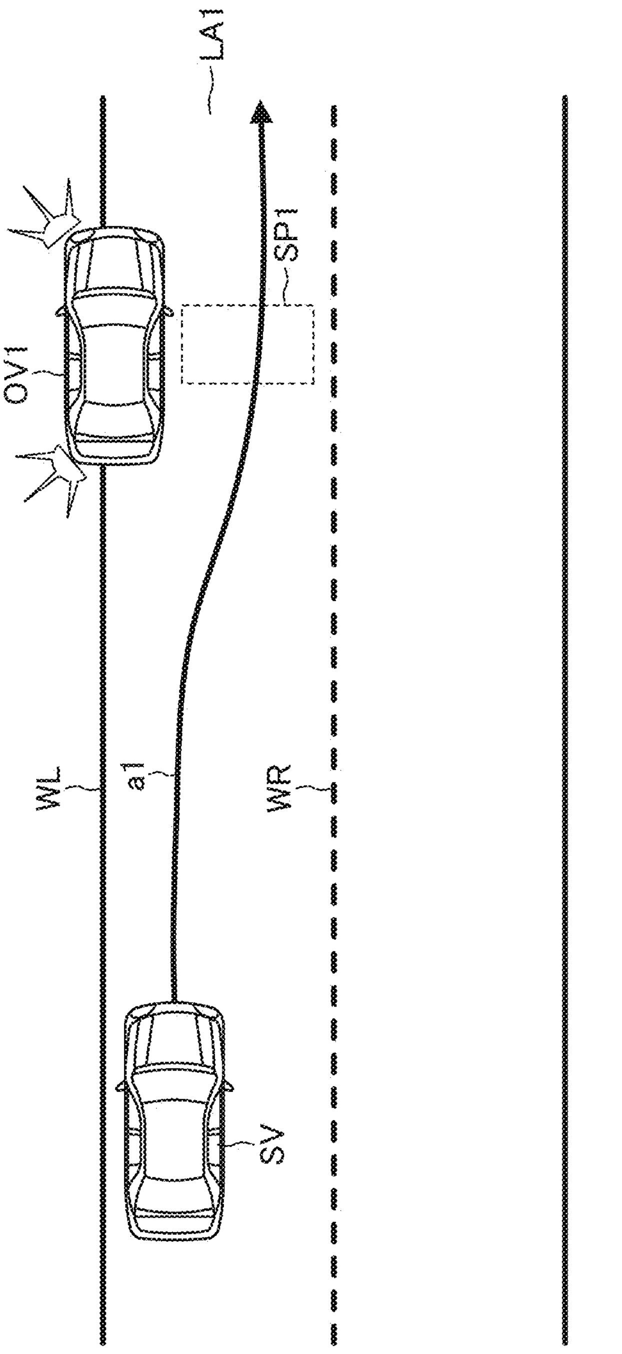
FIG. 5 is another figure for describing the outline of operations of the collision avoidance support apparatus.

In an example shown in FIG. 5, the left turn indicators of the frontward vehicle OV1 are blinking/operating (i.e., the indicated direction by the turn indications is the leftward direction), and the planned collision avoidance direction of the host vehicle SV is the rightward direction. Therefore, the indicated direction by the turn indicators is a direction different from the planned collision avoidance direction of the host vehicle SV (i.e, they are opposite to each other). In such a case where the indicated direction by the turn indicators of the frontward vehicle OV1 is the direction that is different from the planned collision avoidance direction of the host vehicle SV, there is a probability that the frontward vehicle OV1 moves away from the host vehicle SV (in the lane width direction) after the host vehicle SV starts traveling the collision avoidance path (i.e., after the collision avoidance steering control is started). Thus, if the collision avoidance steering control started at an early timing, and thereafter, the frontward vehicle OV1 starts moving in the indicated direction, a movement amount in a lateral direction of the host vehicle SV due to the collision avoidance steering control may become excessively large. If this happens, the driver may feel uncomfortable/bothered by the collision avoidance steering control. In other words, even when the frontward vehicle OV1 is expected to move away from the host vehicle SV, and thus, the driver of the host vehicle SV feels that the steering is not necessary to avoid the collision or a slight steering is sufficient to avoid the collision, the collision avoidance steering control that does not take into account the movement of the frontward vehicle OV1 may be started. If this happens, the driver may feel uncomfortable/bothered by the collision avoidance steering control.

In view of the above, in the above-described case, the DSECU sets the first condition in such a manner that an inter-vehicular distance between the host vehicle SV and the frontward vehicle OV1 at a time point at which the first condition (TTC<TTCth) becomes satisfied is shorter as compared to (or than) an inter-vehicular distance between the host vehicle SV and the frontward vehicle OV1 at a time point at which the first condition in the case in which the state of the turn indicators is not the turning direction indicating state. More specifically, in this case, the DSECU sets the threshold time TTCth used in the first condition to a second time TTC2 that is shorter than the first time TTC1. The collision avoidance steering control start condition in which the threshold time TTCth is set at the first time TTC2 is referred to as a "second start condition", for convenience sake. Setting the threshold time TTCth to the first time TTC2 has the same meaning as setting the collision probability threshold to a second probability threshold.

Figure 6:
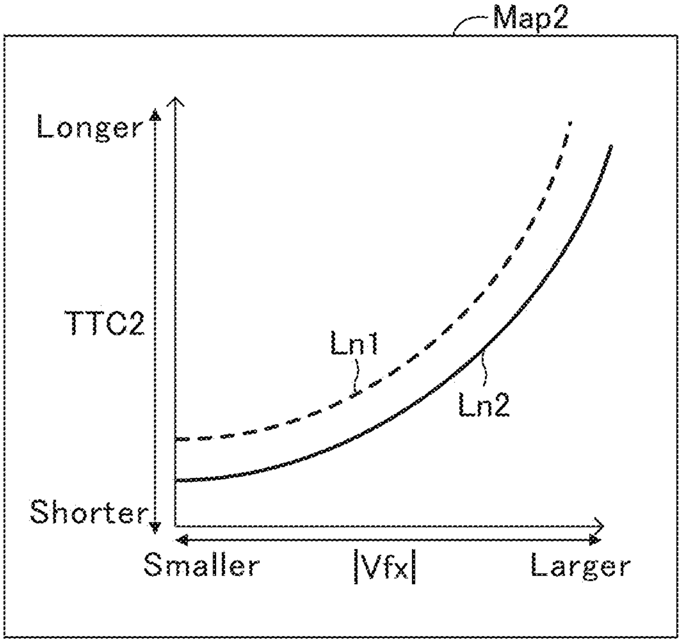
FIG. 6 is a figure for describing a second map Map2.

More specifically, the DSECU determines (obtains) the second time TTC2 by applying the absolute vale (|Vfx|) of the relative speed Vfx of the frontward vehicle OV1 to a second map Map2 that is a lookup table shown in FIG. 6. According to the first map Map2, as shown by a solid line Ln2, the second time TTC2 becomes longer as the absolute vale (|Vfx|) of the relative speed Vfx of the frontward vehicle OV1 becomes larger. In addition, according to the first map Map2, the second time TTC2 is set to a value that is shorter than the first time TTC1 shown by a broken line Ln1 with respect to the absolute vale (|Vfx|) of an arbitrary relative speed Vfx of the frontward vehicle OV1.

Accordingly, when the absolute vale (|Vfx|) of an arbitrary relative speed Vfx of the frontward vehicle OV1 is a certain (an arbitrary) value, a time point (timing) at which the collision avoidance steering control start condition in which the threshold time TTCth is set at the second time TTC2 becomes satisfied is delayed as compared to a time point (timing) at which the collision avoidance steering control start condition in which the threshold time TTCth is set at the first time TTC1 becomes satisfied. In other words, the second start condition is a condition to be able to be satisfied when the inter-vehicular distance between the host vehicle SV and the frontward vehicle OV1 becomes shorter than the inter-vehicular distance between the host vehicle SV and the frontward vehicle OV1 at the time point at which the first start condition become satisfied. The thus configured DSECU can decrease a possibility that the driver feels uncomfortable/bothered by the collision avoidance steering control.

<Specific Operation>

The CPU (hereinafter, simply referred to as a "CPU") of the DSECU executes each of routines shown by flowcharts in FIGS. 7-9, every time a predetermined time elapses.

Figure 7:
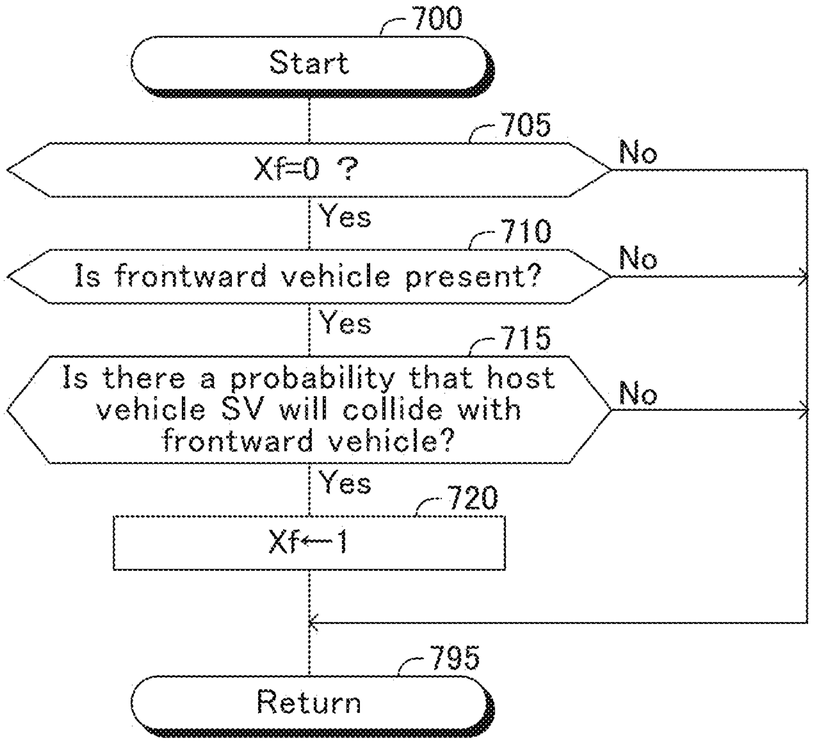
FIG. 7 is a flowchart showing a routine executed by a CPU of a driving support ECU.

Accordingly, when an appropriate time comes, the CPU starts process of step 700 shown in FIG. 7, and proceeds to step 705. At step 705, the CPU determines whether or not a value of a flag (collision probability flag) Xf is "0". The flag Xf indicates, when the value of the flag Xf is equal to "0", that a frontward vehicle OV1 that has a probability of colliding with the host vehicle SV is not present. The flag Xf indicates, when the value of the flag Xf is equal to "1", that a frontward vehicle OV1 that has a probability of colliding with the host vehicle SV is present. The value of the flag Xf is set to "0" through an initialization routine executed by the CPU when an unillustrated ignition key switch of the host vehicle SV is changed from an off position to an on position.

When the value of the flag Xf is "0", the CPU makes a "Yes" determination at step 705, and proceed to step 710. At step 710, the CPU determines, based on the target object information obtained from the surroundings monitoring sensor 21, whether or not a frontward vehicle OV1 is present in the predetermined frontward area of the host vehicle SV. For instance, the predetermined frontward area of the host vehicle SV is an area within a predetermined distance from the host vehicle SV in a moving direction of the host vehicle SV, and having a width in a vehicle width direction of the host vehicle SV wider than the width of the host vehicle SV by a predetermined length.

When the frontward vehicle OV1 is not present in the predetermined frontward area of the host vehicle SV, the CPU makes a "No" determination at step 710, and proceeds to step 795 to terminate the present routine tentatively.

When the frontward vehicle OV1 is present in the predetermined frontward area of the host vehicle SV, the CPU makes a "Yes" determination at step 710, and proceeds to step 715. At step 715, the CPU determines whether or not there is a probability that the host vehicle SV will collide with the frontward vehicle OV1, according to the above-described method. Namely, the CPU determines whether or not the above-described collision probability condition is satisfied.

When there is not a probability that the host vehicle SV will collide with the frontward vehicle OV1, the CPU makes a "No" determination at step 715, and proceeds to step 795 to terminate the present routine tentatively.

In contrast, when there is a probability that the host vehicle SV will collide with the frontward vehicle OV1, the CPU makes a "Yes" determination at step 715, and proceeds to step 720 so as to set the value of the flag Xf to "1". Thereafter, the CPU proceeds to step 795 to terminate the present routine tentatively.

Note that, when the value of the flag Xf is "1" at the time point at which the CPU executes the process of step 705, the CPU makes a "No" determination at step 705, and proceeds to step 795 to terminate the present routine tentatively.

Figure 8:
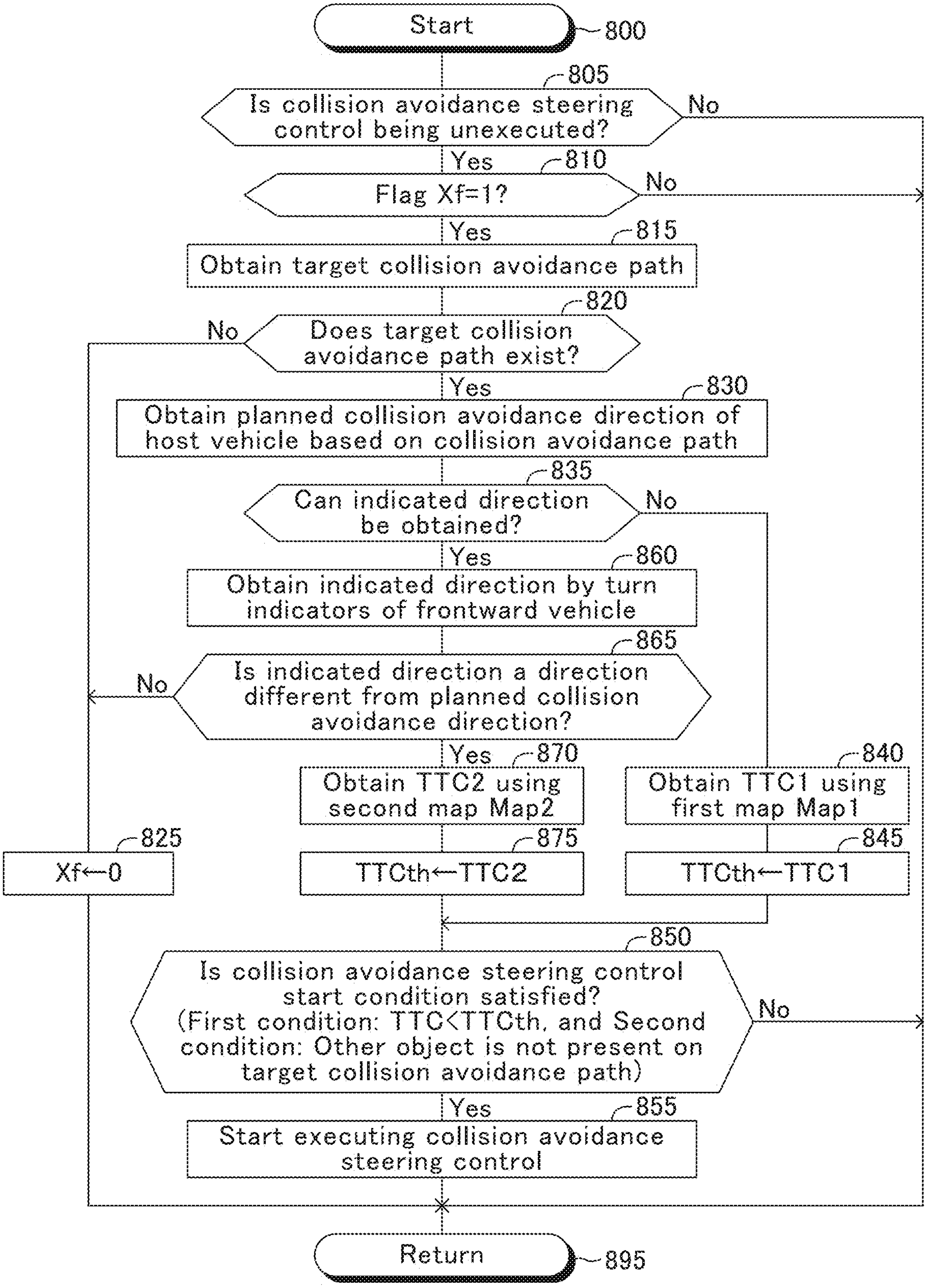
FIG. 8 is a flowchart showing a routine executed by the CPU of the driving support ECU.

When an appropriate time comes, the CPU starts process of step 800 shown in FIG. 8, and proceeds to step 805. At step 805, the CPU determines whether or not the collision avoidance steering control is not being executed (whether or not the current state is a state in which the collision avoidance steering control is not being executed). More specifically, the CPU is configured to determine that the collision avoidance steering control is being executed, when the present time point is in a control execution period which is a period from a start of the collision avoidance steering control to an end (or completion) of the collision avoidance steering control (refer to step 910 shown in FIG. 9, described later). Thus, the CPU is configured to determine that the collision avoidance steering control is not being executed, when the present time point falls outside of the control execution period. When the the present time point is within the control execution period (i.e., when the collision avoidance steering control is being executed), the CPU makes a "No" determination at step 805, and proceeds to step 895 so as to terminate the present routine tentatively.

In contrast, when the collision avoidance steering control is not being executed, the CPU makes a "Yes" determination at step 805, and proceeds to step 810. At step 810, the CPU determines whether or not the value of the flag Xf is "1".

When the value of the flag Xf is "0", the CPU makes a "No" determination at step 810, and proceeds to step 895 so as to terminate the present routine tentatively.

In contrast, when the value of the flag Xf is "1", the CPU makes a "Yes" determination at step 810, and proceeds to step 815. At step 815, the CPU obtains, through calculation, the target collision avoidance path a1 with respect to the frontward vehicle OV1 that has been determined to have the probability of colliding with the host vehicle SV. Thereafter, the CPU proceeds to step 820 so as to determine whether or not the target collision avoidance path a1 exists (i.e., whether or not there is the target collision avoidance path a1 that satisfies all of the above-described conditions A1 to A3).

When the target collision avoidance path a1 does not exist, the CPU makes a "No" determination at step 820, and proceeds to step 825. At step 825, the CPU sets the value of the flag Xf to "0". Thereafter, the CPU proceeds to step 895 so as to terminate the present routine tentatively. Accordingly, in this case, the collision avoidance steering control with respect to the frontward vehicle OV1 is not performed (namely, the collision avoidance steering control is prohibited). It should be noted, however, that the automatic brake control is generally executed to avoid the collision.

In contrast, when the target collision avoidance path a1 exists, the CPU makes a "Yes" determination at step 820, and proceeds to step 830. At step 830, the CPU obtains the planned collision avoidance direction of the host vehicle SV based on the information on the planned collision avoidance direction. Thereafter, the CPU proceeds to step 835 so as to determine, based on the information on the indicated direction, whether or not the state of the turn indicators is the above-described turning direction indicating state (i.e., whether or not the CPU succeeds to have obtained the the indicated direction by the turn indicators of the frontward vehicle OV1).

When the state of the turn indicators is not the above-described turning direction indicating state, the CPU makes a "No" determination at step 835, and executes processes of step 840 and step 845 described below in this order so as to proceed to step 850.

Step 840: The CPU obtains the first time TTC1 by applying the absolute value (|Vfx|) of the relative speed Vfx of the frontward vehicle OV1 to the first map Map1.

Step 845: The CPU sets the threshold time TTCth to the first time TTC1.

Thereafter, the CPU proceeds to step 850, and determines whether not the above-described collision avoidance steering control start condition is satisfied (i.e., whether both of the first and second conditions are satisfied). It should be noted that, in this case, the threshold TTCth used in the first condition is set at the first time TTC1.

When the collision avoidance steering control start condition is not satisfied, the CPU makes a "NO" determination at step 850, and proceeds to step 895 so as to terminate the present routine tentatively.

Whereas, when the collision avoidance steering control start condition is satisfied, the CPU makes a "Yes" determination at step 850, and proceeds to step 855. At step 855, the CPU starts executing the collision avoidance steering control. Namely, the CPU starts letting the host vehicle travel along the target collision avoidance path a1. Thereafter, the CPU proceeds to step 895 so as to terminate the present routine tentatively.

At the time point at which the CPU executes the process of step 835, the CPU makes a "Yes" determination at step 835 and proceeds to step 860, when the state of the turn indicators is the above-described turning direction indicating state. At step 860, the CPU obtains, based on the information on the indicated direction, the indicated direction. Subsequently, the CPU proceeds to step 865 so as to determine whether or not the indicated direction by the turn indicators is a direction different from the planned collision avoidance direction.

When the indicated direction by the turn indicators is the same direction as the planned collision avoidance direction, the CPU makes a "No" determination at step 865, and proceeds to step 825. At step 825, the CPU sets the value of the flag Xf to "0", and proceeds to step 895 so as to terminate the present routine tentatively. Accordingly, in this case, the collision avoidance steering control with respect to the frontward vehicle OV1 is not performed (namely, the collision avoidance steering control is prohibited).

Whereas, when the indicated direction by the turn indicators is the direction different from the planned collision avoidance direction, the CPU makes a "Yes" determination at step 865, and executes processes of step 870 and step 875 described below in this order so as to proceed to step 850.

Step 870: The CPU obtains the second time TTC2 by applying the absolute value (|Vfx|) of the relative speed Vfx of the frontward vehicle OV1 to the second map Map2.

Step 875: The CPU sets the threshold time TTCth to the second time TTC2. As described above, the second time TTC2 with respect to the arbitrary absolute vale (|Vfx|) is shorter than the first time TTC1 with respect to the same absolute vale (|Vfx|).

When the CPU proceeds to step 850, the CPU determines whether or not the above-described collision avoidance steering control start condition is satisfied (i.e., whether both of the first and second conditions are satisfied). It should be noted that, in this case, the threshold TTCth used in the first condition is set at the second time TTC2.

When the collision avoidance steering control start condition is not satisfied, the CPU makes a "No" determination at step 850, and proceeds to step 895 so as to terminate the present routine tentatively.

Whereas, when the collision avoidance steering control start condition is satisfied, the CPU makes a "Yes" determination at step 850, and proceeds to step 855. At step 855, the CPU starts executing the collision avoidance steering control. In this case, the collision avoidance steering control starts later than the case in which the threshold TTCth is set at the first time TTC1. In other words, since the threshold TTCth in the collision avoidance steering control start condition is set at the second time TTC2, the collision avoidance steering control is started at a time point at which the inter-vehicular distance between the host vehicle SV and the frontward vehicle OV1 becomes smaller/shorter as compared to the case in which the threshold TTCth is set at the first time TTC1. Thereafter, the CPU proceeds to step 895 so as to terminate the present routine tentatively.

Figure 9:
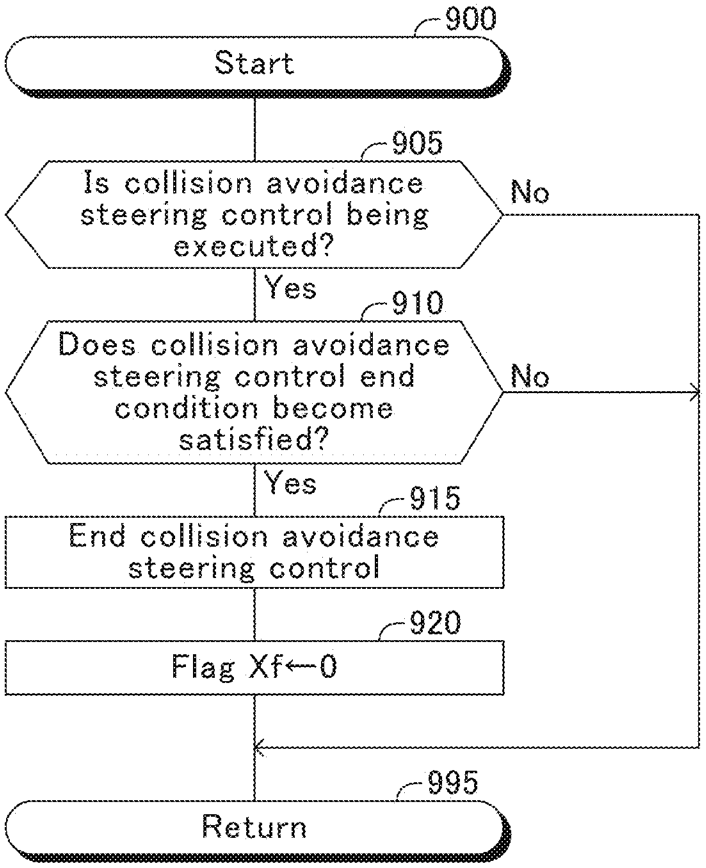
FIG. 9 is a flowchart showing a routine executed by the CPU of the driving support ECU.

When an appropriate time comes, the CPU starts process of step 900 shown in FIG. 9, and proceeds to step 905. At step 905, the CPU determines whether or not the collision avoidance steering control is being executed.

When the collision avoidance steering control is not being executed, the CPU makes a "No" determination at step 905, and proceeds to step 995 so as to terminate the present routine tentatively.

When the collision avoidance steering control is being executed, the CPU makes a "Yes" determination at step 905, and proceeds to step 910. At step 910, the CPU determines whether or not a predetermined collision avoidance steering control end condition becomes satisfied. For example, the collision avoidance steering control end condition becomes satisfied when the host vehicle SV reaches a position next to (or juxtaposing to) the frontward vehicle OV1 in the lane width direction after traveling along the target collision avoidance path a1.

When the collision avoidance steering control end condition is not satisfied, the CPU makes a "No" determination at step 910, and proceeds to step 995 so as to terminate the present routine tentatively.

Whereas, when the collision avoidance steering control end condition is satisfied, the CPU makes a "Yes" determination at step 910, and executes processes of step 915 and step 920 described below in this order, and then, proceeds to step 995 so as to terminate the present routine tentatively.

Step 915: The CPU ends/completes the collision avoidance steering control.

Step 920: The CPU sets the value of the flag Xf to "0".

The present disclosure is not limited to the above embodiment, and may employ various modifications based on the technical concept of the present disclosure.

For example, in the above embodiment, each of the first time TTC1 and the second time TTC2 may be varied depending on an overlap ratio LR. The overlap ratio LR is an indicating value representing a degree of an overlap in the vehicle width direction between the host vehicle SV and the frontward vehicle OV1 at a time point at which the host vehicle SV is expected/assumed to collide with the frontward vehicle OV1. The overlap ratio LR is calculated by dividing a length of an overlapping area between the between the host vehicle SV and the frontward vehicle OV1 in the vehicle width direction by the width of the host vehicle SV. The first time TTC1 is set to be a value that becomes longer as the overlap ratio LR is greater. The second time TTC2 is set to be a value that becomes longer as the overlap ratio LR is greater. The second time TTC2 with respect to a certain absolute value (|Vfx|) and a certain overlap ration LR is set to a value shorter than the first time TTC1 with respect to that certain absolute value (|Vfx|) and that certain overlap ration LR.

The DSECU may perform at least a part of processes executed by the target object recognition part 21*c* and/or the surroundings monitoring sensor 21 in the above embodiment. The collision probability indicating value is not limited to the collision prediction time TTC. The collision probability indicating value may be obtained by applying a relative positional relationship between the host vehicle SV and the frontward vehicle OV1, a moving state of the host vehicle SV, and a moving state of the frontward vehicle OV1 to a predetermined look-up table.

Modified Example

The modified example of the present disclosure is as follows. The modified example obtains the target collision avoidance path and a limit indicating value (steering collision avoidance limit indicating value) TTS as described later, and starts executing the collision avoidance steering control when the limit indicating value TTS becomes "0". In other words, the the limit indicating value TTS is a time (length) from the present time point to a time point at which the collision avoidance steering control needs o be started. It can be said that the above-described first condition (i.e., TTC<TTCth) in the collision avoidance steering control start condition is replaced with a condition that the limit indicating value TTS is "0".

Figure 10:
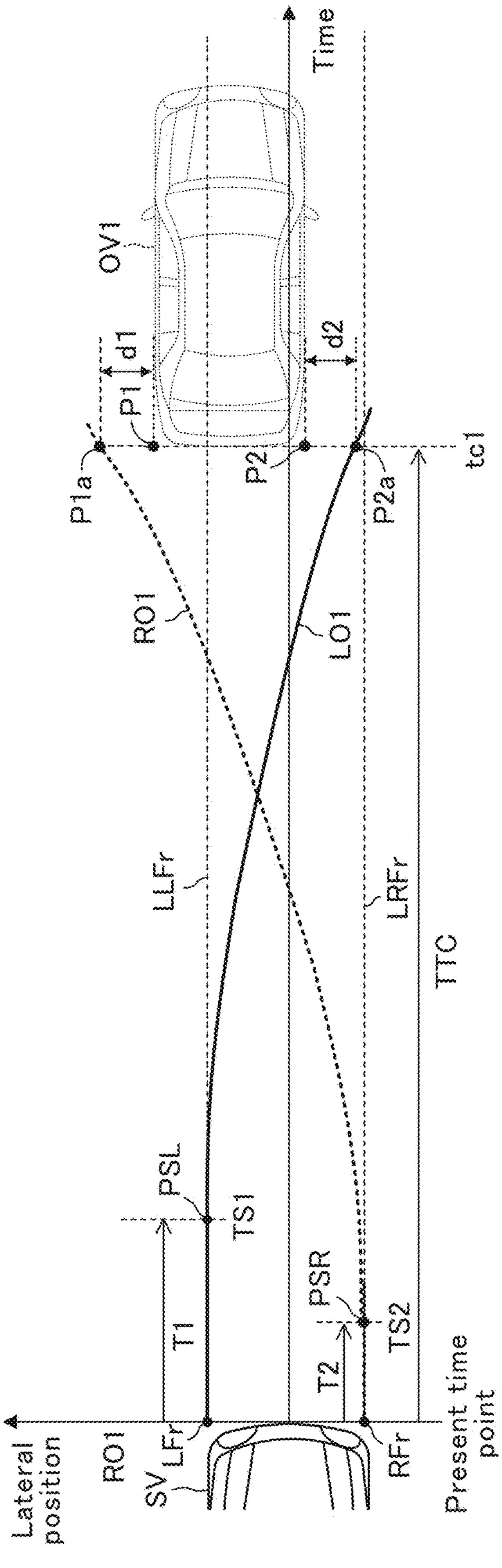
FIG. 10 is a figure for describing an outline of a modified example of the collision avoidance support apparatus.

An operation of the modified example will next be described with reference to FIG. 10. A vertical axis of a coordinate shown in FIG. 10 represents a position in a lateral direction (a position in the vehicle width direction) of the host vehicle SV that is hereinafter referred to as a "lateral position". An origin of the vertical axis is at a center position in the vehicle width direction of a front edge of the host vehicle SV. A positive direction of the vertical axis coincides with the leftward of the host vehicle SV. A transverse axis of the coordinate shown in FIG. 10 represents a time (elapsed time) from the present time point.

Firstly, the DSECU calculates the collision prediction time TTC as described above based on the target object information on the frontward vehicle OV1.

Next, the DSECU obtains a first position P1*a* at a time point tc1 that is the collision prediction time TTC after the present time point, based on the target object information on the frontward vehicle OV1. The first position P1*a* is a position obtained by shifting a position P1 of a left end of a back end edge of the frontward vehicle OV1 at the time point tc1 in the positive direction along the vertical axis shown in FIG. 10 by a predetermined first distance (margin) d1.

Similarly, the DSECU obtains a second position P2*a* at the time point tc1. The second position P2*a* is a position obtained by shifting a position P2 of a right end of the back end edge of the frontward vehicle OV1 at the time point tc1 in the negative direction along the vertical axis shown in FIG. 10 by a predetermined second distance (margin) d2.

The DSECU obtains through calculation a target path of a left-front edge LFr of the host vehicle SV, based on a predetermined profile of a lateral acceleration of the host vehicle SV that has been in stored in the ROM (i.e., a relationship between a lateral acceleration and an elapsed time from the start of the collision avoidance steering control). For example, according to the profile of a lateral acceleration, the lateral acceleration increases from "0" to a "lateral acceleration having a magnitude A" with the elapsed time from the start of the collision avoidance steering control, and thereafter, the the lateral acceleration is kept at the "lateral acceleration having the magnitude A". It should be noted that the DSECU uses, as the lateral acceleration, a value obtained by giving a minus sign to the "magnitude of the lateral acceleration acquired based on the profile of the lateral acceleration", when the DSECU obtains the target path of the left-front edge LFr. The DSECU obtains a collision avoidance predicted path LO1 of the left-front edge LFr of the host vehicle SV, by shifting the target path of the left-front edge LFr in such a manner that a point of origin of the shifted target path is on a path LLFr through which the left-front edge LFr of the host vehicle SV is expected to pass, and that the shifted target path passes through the second position P2*a*.

Subsequently, the DSECU specifies a "time point (required steering start time point) TS1 at which steering needs to be started" in order for the left-front edge LFr of the host vehicle SV to move along the collision avoidance predicted path LO1. In addition, the DSECU obtains, as a first steering start margin time T1, a time from the present time point to the required steering start time point TS1. It should be noted that the DSECU can also calculate the first steering start margin time T1 by dividing a distance between the present position of the host vehicle SV and the point of origin PSL of the collision avoidance predicted path LO1 by the current vehicle speed Vs of the host vehicle SV.

Similarly, the DSECU obtains through calculation a target path of a right-front edge RFr of the host vehicle SV, based on the above-described predetermined profile of the lateral acceleration. The DSECU uses, as the lateral acceleration, a value obtained by giving a plus sign to the "magnitude of the lateral acceleration acquired based on the profile of the lateral acceleration", when the DSECU obtains the target path of the right-front edge RFr. The DSECU obtains a collision avoidance predicted path RO1 of the right-front edge RFr of the host vehicle SV, by shifting the target path of the right-front edge RFr in such a manner that a point of origin of the shifted target path is on a path LRFr through which the right-front edge RFr of the host vehicle SV is expected to pass, and that the shifted target path passes through the first position P1*a*.

Subsequently, the DSECU specifies a "time point (required steering start time point) TS2 at which steering needs to be started" in order for the right-front edge RFr of the host vehicle SV to move along the collision avoidance predicted path RO1. In addition, the DSECU obtains, as a second steering start margin time T2, a time from the present time point to the required steering start time point TS2. It should be noted that the DSECU can also calculate the second steering start margin time T2 by dividing a distance between the present position of the host vehicle SV and the point of origin PSR of the collision avoidance predicted path RO1 by the current vehicle speed Vs of the host vehicle SV.

An outline of an operation of the modified embodiment will next be described.

The DSECU of the modified embodiment determines whether or not the above-described collision probability condition becomes satisfied. When the DSECU determines that the above-described collision probability condition becomes satisfied (in other words, determines that the frontward vehicle OV1 that is likely to collide with the host vehicle SV is present), the DSECU executes the following processes.

(1) The DSECU acquires the collision avoidance predicted path LO1, the first steering start margin time T1, the collision avoidance predicted path RO1, and the second steering start margin time T2, according to the above-described methods.

(2) The DSECU determines whether or not a rightward collision avoidance steering condition is satisfied. The rightward collision avoidance steering condition is satisfied, when the both of the following conditions are satisfied.

- There is a collision avoidance space that does not cause the host vehicle SV to deviate from the traveling lane and that allows the host vehicle SV to pass through at the right side of the frontward vehicle OV1 at a time point at which the host vehicle SV is expected to collide with the frontward vehicle OV1 (i.e., a time point tc1 at which the collision prediction time TTC has elapsed since the present time point).
- When the host vehicle SV travels in such a manner that the left-front edge LFr of the host vehicle SV moves along the collision avoidance predicted path LO1, an "object other than the frontward vehicle OV1" is not present. Here, the "object other than the frontward vehicle OV1" is an object that collides with the host vehicle SV or whose distance to the host vehicle becomes equal to or smaller than a predetermined minimum distance.

(3) The DSECU determines whether or not a leftward collision avoidance steering condition is satisfied. The leftward collision avoidance steering condition is satisfied, when the both of the following conditions are satisfied.

There is a collision avoidance space that does not cause the host vehicle SV to deviate from the traveling lane and that allows the host vehicle SV to pass through at the left side of the frontward vehicle OV1 at the time point tc1 at which the host vehicle SV is expected to collide with the frontward vehicle OV1.

When the host vehicle SV travels in such a manner that the right-front edge RFr of the host vehicle SV moves along the collision avoidance predicted path RO1, an "object other than the frontward vehicle OV1" is not present. Here, the "object other than the frontward vehicle OV1" is an object that collides with the host vehicle SV or whose distance to the host vehicle becomes equal to or smaller than the predetermined minimum distance.

(4) When neither the rightward collision avoidance steering condition nor the leftward collision avoidance steering condition is satisfied, the DSECU prohibits the collision avoidance steering control. In this case, the DSECU sets the limit indicating value TTS to a substantial infinite value (time).

(5) When the rightward collision avoidance steering condition is satisfied while the leftward collision avoidance steering condition is not satisfied, the DSECU employs the collision avoidance predicted path LO1 as a target collision avoidance path for the left-front edge LFr of the host vehicle SV, and employs the first steering start margin time T1 as the limit indicating value TTS.

(6) When the leftward collision avoidance steering condition is satisfied while the rightward collision avoidance steering condition is not satisfied, the DSECU employs the collision avoidance predicted path RO1 as a target collision avoidance path for the right-front edge RFr of the host vehicle SV, and employs the second steering start margin time T2 as the limit indicating value TTS.

(7) When both of the rightward collision avoidance steering condition and the leftward collision avoidance steering condition are satisfied, the DSECU employs, as the limit indicating value TTS, either the first steering start margin time T1 or the second steering start margin time T2, whichever is longer. In addition, the DSECU employs the collision avoidance predicted path that corresponds to either the first steering start margin time T1 or the second steering start margin time T2, whichever is longer, as the target collision avoidance path for the corresponding front edge (i.e., the left-front edge LFr or the right-front edge RFr) of the host vehicle SV.

(8) The DSECU repeats the above-described processes (1) to (7) every time a predetermined time elapses, and determines (monitors) whether or not the limit indicating value TTS has reached "0". When the limit indicating value TTS has reached "0", the DSECU further executes the following processes.

(9) The DSECU determines whether or not the state of the turn indicators is the turning direction indicating state, based on the turn indicator information. When the DSECU determines that the state of the turn indicators is not the turning direction indicating state, the DSECU varies the turning angle of the host vehicle SV in such a manner that "one of the right-front edge RFr and the left-front edge LFr" of the host vehicle SV that corresponds to the collision avoidance predicted path that has been set as the target collision avoidance path moves along the target collision avoidance path. Namely, the DSECU starts the collision avoidance steering control. It should be noted that a start time point of the collision avoidance steering control when the collision avoidance predicted path LO1 has been employed as the target collision avoidance path is referred to as a "rightward normal time point". A start time point of the collision avoidance steering control when the collision avoidance predicted path RO1 has been employed as the target collision avoidance path is referred to as a "leftward normal time point".

(10) Based on the turn indicator information and the target collision avoidance path, when the DSECU determines that the state of the turn indicators of the frontward vehicle OV1 is the turning direction indicating state, the DSECU determines whether or not the indicated direction by the turn indicators of the frontward vehicle OV1 is a direction different from the planned collision avoidance direction of the host vehicle SV. When the DSECU determines that the indicated direction by the turn indicators of the frontward vehicle OV1 is the same direction as the planned collision avoidance direction of the host vehicle SV, the DSECU prohibits the collision avoidance steering control (i.e., the DSECU does not start the collision avoidance steering control).

(11) Whereas, based on the turn indicator information and the target collision avoidance path, when the DSECU determines that the state of the turn indicators of the frontward vehicle OV1 is the turning direction indicating state and that the indicated direction by the turn indicators of the frontward vehicle OV1 is the direction different from the planned collision avoidance direction of the host vehicle SV, the DSECU does not immediately start the collision avoidance steering control, but executes the following processes.

(11-1) In a case where the planned collision avoidance direction is rightward (i.e., when the rightward collision avoidance steering condition is satisfied while the leftward collision avoidance steering condition is not satisfied, and when the collision avoidance predicted path LO1 has been employed as the target collision avoidance path).

In this case, the DSECU obtains, as the second position P2*a*, a point obtained by shifting a position P2 of the right end of the back end edge of the frontward vehicle OV1 at the time point tc1 in the negative direction along the vertical axis shown in FIG. 10 by a "predetermined second correction distance" smaller than the above-described second distance d2.

Thereafter, the DSECU reacquires, as the target collision avoidance path, the collision avoidance predicted path LO1 for the left-front edge LFr using the thus obtained second position P2*a*, and reacquires the first steering start margin time T1 serving as the limit indicating value TTS (i.e., a time to the required steering start time point TS1). The DSECU repeats these processes every time a predetermined time elapses. From a time point at which the thus obtained first steering start margin time T1 has reached "0" (this time point is referred to as a "rightward delayed time point", for convenience sake), the DSECU varies the turning angle of the host vehicle SV in such a manner that the left-front edge LFr moves along the target collision avoidance path (i.e., along the collision avoidance predicted path LO1). Namely, the DSECU starts the collision avoidance steering control. The rightward delayed time point is later than the above-described rightward normal time point. In other words, the inter-vehicular distance between the host vehicle SV and the frontward vehicle OV1 at the rightward delayed time point is shorter than the inter-vehicular distance between the host vehicle SV and the frontward vehicle OV1 at the rightward normal time point. Accordingly, the present modified embodiment can decrease a possibility that the driver feels uncomfortable/bothered by the collision avoidance steering control, similarly to the above-described embodiment.

(11-2) In a case where the planned collision avoidance direction is leftward (i.e., when the leftward collision avoidance steering condition is satisfied while the rightward collision avoidance steering condition is not satisfied, and when the collision avoidance predicted path RO1 has been employed as the target collision avoidance path).

In this case, the DSECU obtains, as the first position P1*a*, a point obtained by shifting a position P1 of the left end of the back end edge of the frontward vehicle OV1 at the time point tc1 in the positive direction along the vertical axis shown in FIG. 10 by a "predetermined first correction distance" smaller than the above-described first distance d1.

Thereafter, the DSECU reacquires, as the target collision avoidance path, the collision avoidance predicted path RO1 for the right-front edge RFr using the thus obtained first position P1*a*, and reacquires the second steering start margin time T2 serving as the limit indicating value TTS (i.e., a time to the required steering start time point TS2). The DSECU repeats these processes every time a predetermined time elapses. From a time point at which the thus obtained second steering start margin time T2 has reached "0" (this time point is referred to as a "leftward delayed time point", for convenience sake), the DSECU varies the turning angle of the host vehicle SV in such a manner that the right-front edge RFr moves along the target collision avoidance path (i.e., along the collision avoidance predicted path RO1). Namely, the DSECU starts the collision avoidance steering control. The leftward delayed time point is later than the above-described leftward normal time point. In other words, the inter-vehicular distance between the host vehicle SV and the frontward vehicle OV1 at the leftward delayed time point is shorter than the inter-vehicular distance between the host vehicle SV and the frontward vehicle OV1 at the leftward normal time point. Accordingly, the present modified embodiment can decrease a possibility that the driver feels uncomfortable/bothered by the collision avoidance steering control, similarly to the above-described embodiment.

What is claimed is:

1. A control apparatus comprising a controller which executes a collision avoidance control to avoid a collision between a host vehicle and a frontward vehicle by controlling an actuator of said host vehicle for said collision avoidance control, when there is a high probability that said host vehicle collides with said frontward vehicle, wherein, said controller is configured to:

obtain an expected moving direction of said frontward vehicle;

prohibit executing said collision avoidance control when said expected moving direction of said frontward vehicle is a direction which is the same as a planned collision avoidance direction of said host vehicle by said collision avoidance control; and set a control start condition to start said collision avoidance control, when said expected moving direction of said frontward vehicle is a direction which is different from said planned collision avoidance direction of said host vehicle by said collision avoidance control, to a condition that becomes satisfied at a later timing as compared to a case in which said expected moving direction of said frontward vehicle is unable to be obtained.

2. The control apparatus according to claim 1, wherein, said controller is configured to obtain said expected moving direction of said frontward vehicle based on a direction indicated by turn indicators of said frontward vehicle that are blinking.

3. The control apparatus according to claim 2, wherein, said controller is configured to be unable to obtain said expected moving direction of said frontward vehicle, when neither a left turn indicator of said turn indicators nor a right turn indicator of said turn indicators is blinking, and when both of said left turn indicator and said right turn indicator are blinking.

4. A control method to execute a collision avoidance control to avoid a collision between a host vehicle and a frontward vehicle by controlling an actuator of said vehicle for said collision avoidance control, when there is a high probability that said host vehicle collides with said frontward vehicle, comprising;

a step of obtaining an expected moving direction of said frontward vehicle;

a step of prohibiting executing said collision avoidance control when said expected moving direction of said frontward vehicle is a direction which is the same as a planned collision avoidance direction of said host vehicle by said collision avoidance control; and a step of setting a control start condition to start said collision avoidance control, when said expected moving direction of said frontward vehicle is a direction which is different from said planned collision avoidance direction of said host vehicle by said collision avoidance control, to a condition that becomes satisfied at a later timing as compared to a case in which said expected moving direction of said frontward vehicle is unable to be obtained.

* * * * *